Sept. 30, 1941.  H. L. WHITE  2,257,438
RIFLING TOOL
Filed May 8, 1939   2 Sheets-Sheet 1
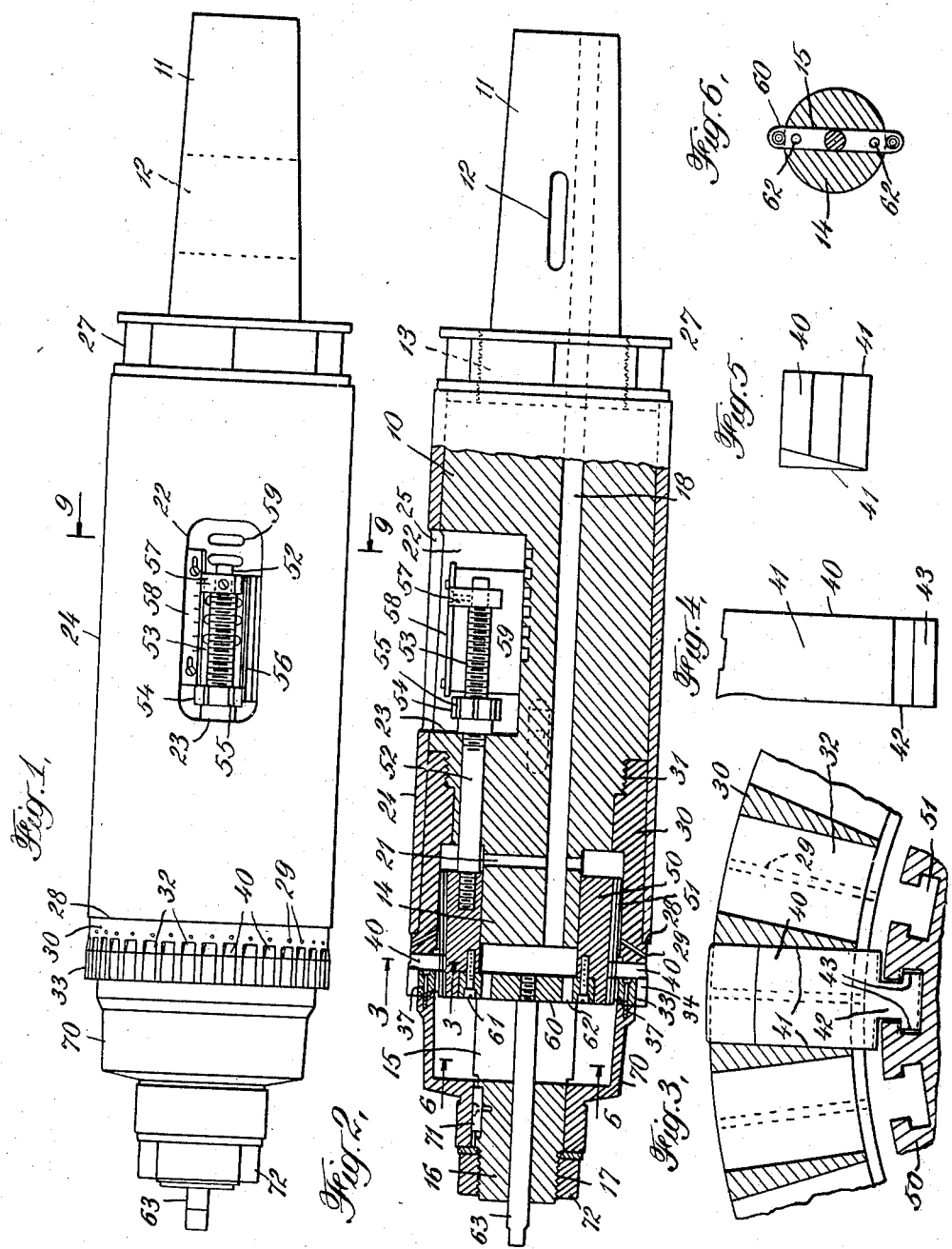
INVENTOR
Howard L. White
BY
Marshall E Hawley
ATTORNEYS Sept. 30, 1941.  H. L. WHITE  2,257,438
RIFLING TOOL
Filed May 8, 1939  2 Sheets-Sheet 2

INVENTOR
Howard L. White
BY
Marshall & Hawley
ATTORNEYS

Patented Sept. 30, 1941

2,257,438

UNITED STATES PATENT OFFICE 2,257,438

RIFLING TOOL

Howard L. White, Brooklyn, N. Y.

Application May 8, 1939, Serial No. 272,384

6 Claims. (Cl. 90—28.1)

This invention relates to improvements in rifling tools, of which the following is a specification, reference being had to the accompanying drawings forming a part thereof.

Such tools as have been available hitherto are incapable of cutting simultaneously all of the grooves required by present ordnance practice. It has been possible to cut half of the grooves by one operation and then by making an angular adjustment of the tool, to cut the other half between those which have been first cut. This is a serious matter, as two such operations, in some cases, take as much as one hundred and forty hours.

The object of this invention is to provide a tool in which the cutters may be positioned more closely together and still be supported with sufficient strength to withstand the pressures to which they are subjected. To this end the invention relates to a novel arrangement for supporting a plurality of radially adjustable cutters in close proximity to one another.

Another object of the invention is to provide an arrangement for guiding the tool accurately in the bore of the gun barrel to be rifled and to provide an improved mechanism for adjusting the cutters radially and indicating the position of the cutters.

These and other objects of the invention will be described in the following specification and its novel features set forth in appended claims.

Referring to the drawings,

Fig. 1 is a plan view of a rifling tool which is made according to and embodies my invention;

Fig. 2 is a sectional side elevation of the tool which is shown in Fig. 1;

Fig. 3 is an end view on a larger scale of the cutters and a sectional end view of some of its supporting parts, the section being taken on the line 3—3 of Fig. 2;

Fig. 4 is a side elevation and Fig. 5 a plan view of one of the cutters;

Fig. 6 is a sectional end elevation of some of the parts, the section being taken on the line 6—6 of Fig. 2;

Figure 7:
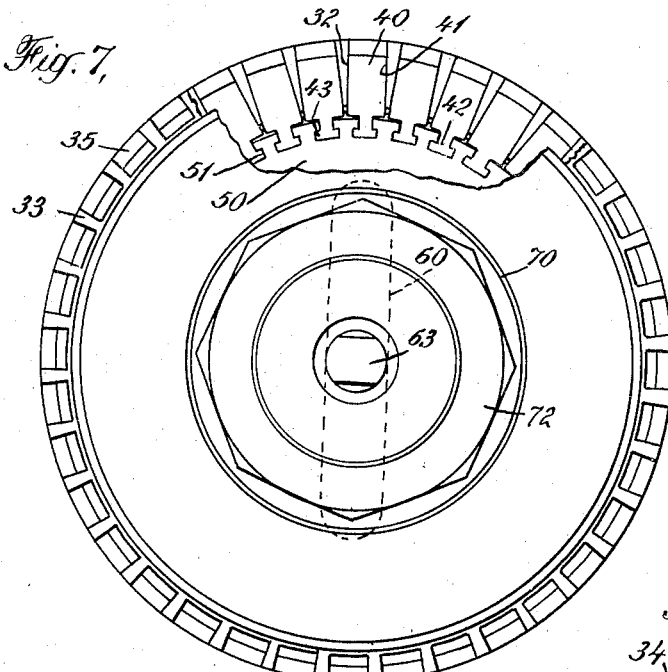
Fig. 7 is an enlarged front end elevation of the tool with parts broken away to more clearly show its construction.

10 designates a substantially cylindrical tool head, the rear end of which forms a shank 11 tapered to fit the socket of the rifling bar of a rifling machine with a transverse slot 12 through it. 13 is a threaded part between the shank and the body of the head. At the other end of this head is cylindrical portion 14, of reduced diameter, through which is cut a transverse slot 15. The front end of the body forms a hub 16 of somewhat less diameter than that of the portion 14. The outer end 17 of the hub is of still smaller diameter and is threaded as shown. 18 is a longitudinal oil duct, offset from the slot 12, running from the rear end of the tool to the slot 15. 21 is a transverse oil duct which communicates with the duct 18 and passes through the portion 14 of the body. A part of the body is cut away as shown, to form a pocket or chamber 22, the forward wall of which is designated by 23. Over the main body of the tool head is a sleeve 24 which is cut away at 25 over the chamber 22. This sleeve is retained between a nut 27 screwed onto the threaded part 13 and a shoulder 28 on a cutter holder 30. Its outer surface is cylindrical and is slightly smaller than the bore of the gun barrel to be rifled.

Figure 8:
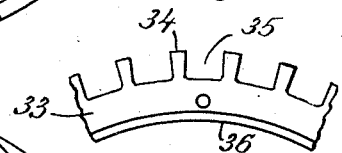
Fig. 8 is a front elevation of a portion of a pilot ring.

The cutter holder is screwed onto the head 10 at 31. Its other end is provided with a plurality of radially disposed parallel sided grooves 32 for supporting and guiding the cutters 40. The cutters are rectangular in cross section. Their sides 41 are ground to have a close sliding fit with the sides of the grooves 32. Their backs rest upon the backs of the grooves and a pilot ring 33 bears against the end of the cutter holder and holds the cutters in the guides. The outer diameter 34 (Fig. 8) of the pilot ring is the same as that of the sleeve 24. Rectangular notches 35 are cut into the periphery of the ring in front of each of the cutters to provide spaces for the discharge of the cuttings. The inner diameter 36 of the pilot ring is of sufficient size to form a clearance for a slidable cutter support 50.

Figure 9:
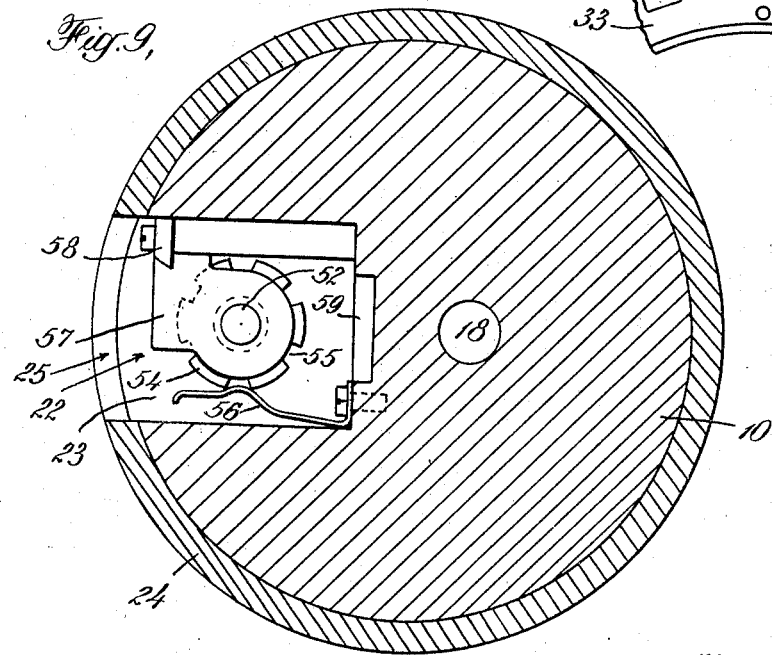
Fig. 9 is a sectional end elevation of the tool showing a part of the cutter adjusting mechanism somewhat in detail. The section in this figure is taken on the line 9—9 of Fig. 1.

The inner ends of the cutters are formed as shown most clearly in Fig. 3, with restricted neck portions 42, from the lower part of which are short lateral projections 43. These inner ends of the cutters are supported by the truncated conical collar 50 which is longitudinally slidable on the reduced cylindrical portion 14 of the body. The neck portions 42 and lateral projections 43 of the cutters fit into under-cut grooves 51 in the collar 50. Oil holes 29 through cutter holder 30 lead to these grooves. 52 is an adjusting rod affixed to the rear end of the collar and extending through a suitable hole in the head into the chamber 22. The end portion of the rod is threaded, as at 53. 54 is an adjusting nut on this threaded part of the rod. Its periphery is notched, as at 55. 56 is a spring having a bend which engages the notches 55 (Fig. 9) and forms a non-positive stop for the nut. 57 is a gauge block affixed to the rod 52 and arranged to cooperate with a graduated scale 58 adjustably affixed to the body 10. 59 designates a plurality of spaced transverse notches in the body 10 at the base of the chamber 22.

60 is a straddle bar affixed to the forward end of the collar 50 by screws 61. This bar fits and slides in the slot 15 in the forward end 14 of the head 10. The bar is perforated at 62 to permit the free circulation of oil through it. 63 is an actuating rod affixed to the straddle bar and extending from it through the hub 16 and threaded end 17 of the head.

70 is a housing provided with a bore which the hub 16 fits. It is held against rotation relative to the hub by a key 71. The pilot ring is affixed to the rear end of housing 70 by screws 37. A nut 72 on the threaded end 17 of the hub holds the housing in place, with the pilot ring 33 in front of the cutters 40.

I will now describe the operation of the device. The head is placed on the end of the rifling bar of a rifling machine and an operator after adjusting the nut 54 forces the collar forwardly by a bar toed into the slots 59 until the nut abuts against the forward wall 23 of the chamber 22. This causes the cutters to project beyond the sleeve 24 and the pilot ring 33 a distance corresponding with the desired depth of cuts. Now the whole tool is driven through the gun barrel. Near the end of the stroke of the rifling bar the actuating rod 63 strikes a fixed abutment and continued movement of the rifling bar and head forces the collar 50 back. The under-cut parts of the grooves 51, by their engagement with the parts 43 of the cutters, retract the cutters. Thus, during the backward stroke of the rifling bar the cutters are drawn in out of the way.

At the end of the backward stroke, when the cutters are out of the gun barrel, the operator backs off the nut 54 a desired amount. The notches 55, the pitch of the thread 53 and the inclination of the grooves 51 are so proportioned that the distance between adjacent notches corresponds with a movement of the cutters one one-thousandth of an inch. The graduations on the scale 58 likewise indicate cutter adjustments in thousandths of an inch. The arrangement for adjusting the position of the scale is to compensate for varying lengths of cutters caused by resharpening them.

The collar 50 is again forced forwardly until the nut 54 abuts the wall 23. The cutters will now project outwardly a little farther than they did before, or into position to make the next cut. This operation is repeated until the rifle grooves have the desired depth.

It is to be noted that oil which is supplied through the rifling bar in the usual manner will be led through the ducts and oil holes which have been pointed out, directly to the desired parts of the tool.

With the tools constructed as described herein, all of the grooves, sometimes as many as one hundred and forty-four in a sixteen inch rifle, may be cut simultaneously. This has not been possible with any tool heretofore available.

By this simple arrangement rifle grooves may be cut with the greatest nicety and the entire operation of rifling a gun accomplished much more rapidly than is possible with the devices now in use. Moreover, injury to a cutter is not a serious matter for an injured cutter may be replaced by a new one without disturbing the others.

Structures of preferred form and construction have been illustrated and described for the purpose of showing ways in which this invention may be used, but the inventive thought upon which this application is based is broader than these illustrative embodiments hereof, and I therefore intend no limitations other than those imposed by the appended claims.

What I claim is:

1. A rifling tool comprising a head, radial guides therein corresponding in number with the entire number of grooves desired in a gun barrel, said guides having parallel sides, a collar supported in the head and longitudinally slidable therein, said collar being constructed with longitudinal under-cut grooves inclined to the axis of the head, and cutters having parallel edges slidably fitting said guides whereby each cutter is guided radially, said cutters having integral inner portions of less width than that of the guides, shaped to fit the grooves in the collar whereby longitudinal movement of the collar in opposite directions will impart transverse movement to the cutters in opposite directions.

2. A rifling tool comprising a head, radial guides therein corresponding in number with the entire number of grooves desired in a gun barrel, said guides having parallel sides, a collar supported in the head and longitudinally slidable therein, said collar being constructed with longitudinal under-cut grooves inclined to the axis of the head, cutters having parallel edges slidably fitting said guides whereby each cutter is guided radially, said cutters having integral inner portions of less width than that of the guides, shaped to fit the grooves in the collar, manual means for longitudinally moving the collar in one direction to move the cutters outwardly, adjustable means for limiting said movement of the collar, and means for automatically moving the collar in the opposite direction to retract the cutters at the end of their cutting movement.

3. A rifling tool comprising a head, radial guides therein corresponding in number with the entire number of grooves desired in a gun barrel, said guides having parallel sides, a collar supported in the head and longitudinally slidable therein, said collar being constructed with longitudinal under-cut grooves inclined to the axis of the head, cutters having parallel edges slidably fitting said guides whereby each cutter is guided radially, said cutters having integral inner portions of less width than that of the guides, shaped to fit the grooves in the collar, a threaded stud affixed to the collar whereby said collar may be manually moved in one direction to move the cutter outwardly, a nut on said stud arranged to limit said movement of the collar, and an actuating rod connected with the collar and projecting beyond the forward end of the head whereby the collar may be moved in the opposite direction by the movement of the head to retract the cutters at the end of their cutting movement.

4. A rifling tool comprising a head, radial guides therein corresponding in number with the entire number of grooves desired in a gun barrel, a collar supported in the head and longitudinally slidable therein, said collar being constructed with longitudinal under-cut grooves inclined to the axis of the head, cutters in said guides having integral inner portions of less width than that of the guides, shaped to fit the grooves in the collar whereby longitudinal movement of the collar in opposite directions will impart transverse movement to the cutters in opposite directions, and a pilot ring arranged to close the inner portions of the guides to retain the cutters in the guides.

5. A rifling tool comprising a head, radial guides therein corresponding in number with the entire number of grooves desired in a gun barrel, a collar supported in the head and longitudinally slidable therein, said collar being constructed with longitudinal under-cut grooves inclined to the axis of the head, cutters in said guides having integral inner portions of less width than of the guides, shaped to fit the grooves in the collar whereby longitudinal movement of the collar in opposite directions will impart transverse movement to the cutters in opposite directions, and a pilot ring arranged to close the inner portions of the guides to retain the cutters in the guides, said pilot ring being peripherally notched in front of each cutter.

6. A rifling tool comprising a head, radial guides therein corresponding in number with the entire number of grooves desired in a gun barrel, said guides having parallel sides, a collar supported in the head and longitudinally slidable therein, said collar being constructed with longitudinal under-cut grooves inclined to the axis of the head, and cutters having parallel edges slidably fitting said guides whereby each cutter is guided radially, said cutters having integral inner portions of less width than that of the guides, shaped to fit the grooves in the collar whereby longitudinal movement of the collar in opposite directions will impart transverse movements to the cutters in opposite directions, said cutters having their cutting edges disposed in a common plane normal to the axis of the head and side edges parallel to planes through the axis of the head and through the centers of the cutters.

HOWARD L. WHITE.